(No Model.)
C. C. BORTON.
SIDE BEARING FOR RAILWAY CARS.
No. 604,186. Patented May 17, 1898.
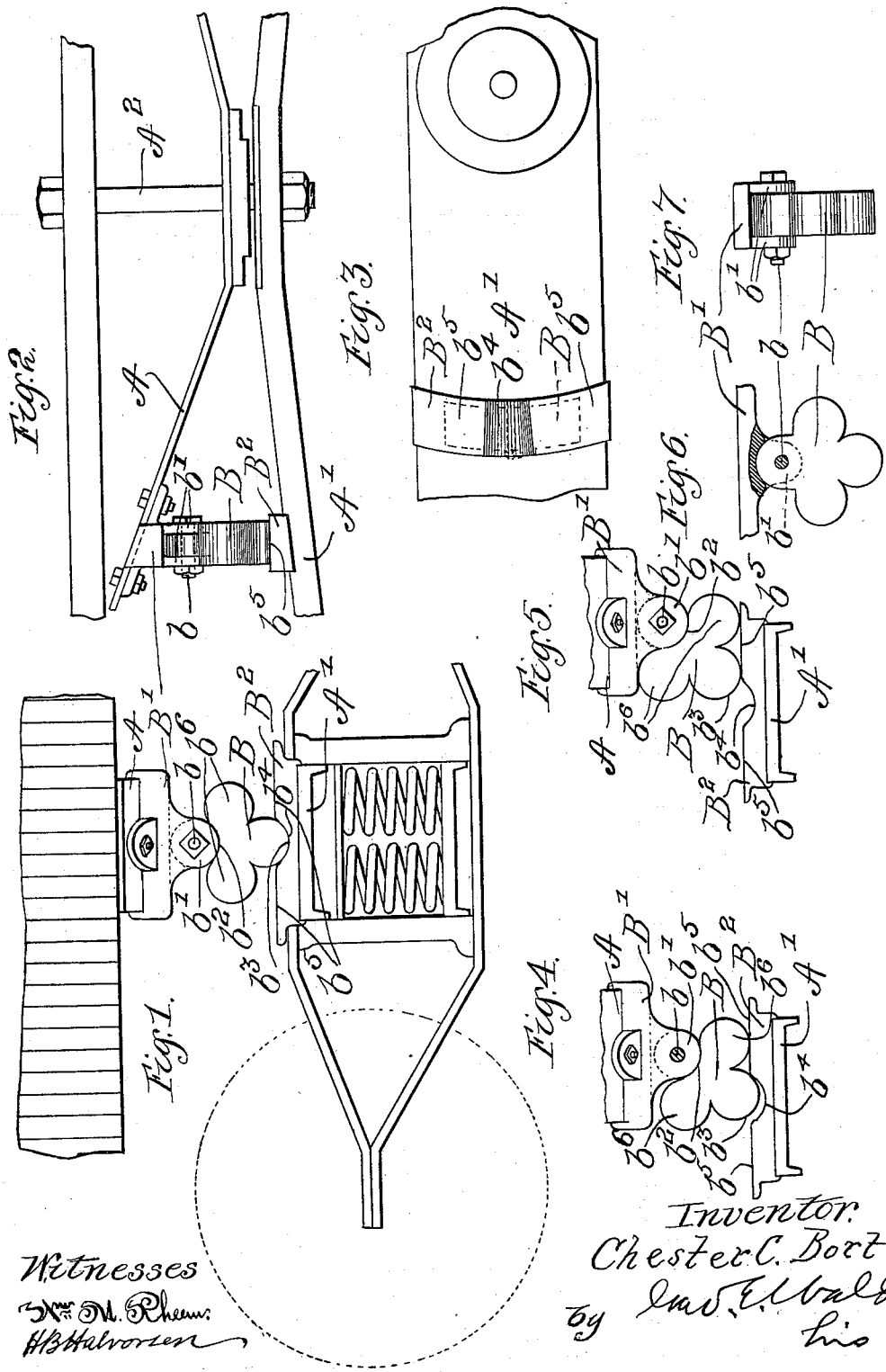
Witnesses
Inventor
Chester C. Borton,
by Jno. E. Ubaldo,
his Atty.

UNITED STATES PATENT OFFICE.

CHESTER C. BORTON, OF CHICAGO, ILLINOIS, ASSIGNOR OF ONE-HALF TO EDGAR C. DODGE, OF SAME PLACE.

SIDE BEARING FOR RAILWAY-CARS.

SPECIFICATION forming part of Letters Patent No. 604,186, dated May 17, 1898.

Application filed December 23, 1897. Serial No. 663,247. (No model.)

*To all whom it may concern:*

Be it known that I, CHESTER C. BORTON, a citizen of the United States, and a resident of Chicago, in the county of Cook and State of Illinois, have invented an Improved Side Bearing for Railway-Cars, of which the following is a specification.

This invention relates to side bearings for railway-cars adapted to support the car-body on each side of the king-bolt.

The object of the invention is to provide a novel bearing for this purpose which will be efficient in its operation and of simple and cheap construction.

In the accompanying drawings a side bearing embodying my invention is fully illustrated.

Figure 1 is a partial side view of a railway-car equipped with my side bearing. Fig. 2 is an end view thereof. Fig. 3 is a top plan view of the truck-bolster. Figs. 4 and 5 are side views showing the operation of my improved bearing in different positions of the truck relatively to the car-body, and Figs. 6 and 7 illustrate a modification of my improved side bearing.

Referring now to the drawings, A designates the car-bolster, A' the truck-bolster, and $A^2$ the king-bolt, whereby the truck is connected to the body of the car, all of which are old and may be of any usual or approved construction.

Broadly stated, a side bearing embodying my invention consists of a strut or brace B, seats or surfaces formed on which are adapted to engage corresponding seats or surfaces formed on the car and truck bolsters, so as to form thrust-bearings, said strut or brace being supported in position by suitable means which will allow articulation of said thrust-bearings.

In the preferable embodiment of my invention illustrated the strut or brace B is pivoted at $b$ to lugs $b'$, formed on a clip B', secured to the car-bolster A. The ends of the lugs $b'$ form arcs of circles described from the pivotal point $b$ as a center and engage circular seats or shoulders $b^2$, formed on the strut or brace B, the arcs of said seats or bearings having the same radii as the arcs of the bearings on the lugs $b'$ and being likewise concentric with the pivotal point $b$. The lugs $b'$ and the shoulders $b^2$ are cut away or relieved, so as to allow desired movement of the strut or brace B.

The free end $b^3$ of the strut or brace B is circular and is adapted to engage a circular seat or recess $b^4$, formed at the middle of a clip $B^2$, secured to the truck-bolster A', the radii of said circular bearings $b^3$ $b^4$ being the same and the exposed surface $b^5$ of the clip $B^2$ being plane.

With a side bearing of the construction described it is obvious that when the car-body and truck are in alinement with each other, and also within limits when at an angle to each other due to pivotal movement of the truck relative to the car-body, as when on a curve, the seats or surfaces on the strut or brace B will be in full engagement with the seats or surfaces on the clips B' $B^2$ and will sustain the entire thrust due to swaying of the car-body caused by unevenness of the track, centrifugal force when rounding a curve, or other cause.

In the preferable construction shown also the strut or brace B is provided with lateral projections $b^6$, which will be brought into contact with the surface $b^5$ of the clip $B^2$ by swaying of the car-body when pivotal movement of the truck has drawn said strut or brace partially or wholly out of engagement with the seat or recess $b^4$ on the clip $B^2$, as clearly shown in Figs. 4 and 5 of the drawings. Preferably also the relation of parts is such that when both the surface $b^3$ on the free end of the strut or brace B and one of the lugs $b^6$ rest upon the plane surface $b^5$ the other lug $b^6$ will rest in contact with a rigid portion of the clip B'. It is thus obvious that the thrust due to the swaying of the car-body will at all times be sustained exclusively by the strut or brace B and that the pivot will be subjected to no strain whatever.

In the preferable construction shown also the elements of the bearing-surfaces on the strut or brace B and the clips B' $B^2$ extend radially relatively to the king-bolt $A^2$, thereby producing a more perfect bearing between said strut or brace and its supporting-surfaces.

In Figs. 6 and 7 of the drawings I have shown a modification of my improved side bearing. Said modification consists in making both ends of the strut or brace B circular and in providing circular seats or recesses therefor in the clips B' B², the seat or recess on the clip B' being concentric with the point of pivotal attachment of said strut or brace to the lugs b'. In said modified form of my improved bearing the only function of the lugs b' is to support the pivot-pin b. In said modified form of my improved bearing also I prefer to make the strut or brace B of the same thickness throughout, thus increasing the strength thereof and at the same time simplifying its form.

I claim—

1. A side bearing for railway-cars consisting of a strut or brace pivoted to the car or body bolster, a seat or bearing thereon, which is adapted to engage a seat or bearing on said bolster, a seat or bearing on the lower or free end of said strut or brace, which is adapted to engage a seat or bearing on the truck-bolster, supporting-surfaces at both sides of said seat or bearing on the truck-bolster and lateral projections on said strut or brace which are adapted to be brought into contact with said supporting-surfaces, the relation of parts being such as to allow limited depression of the side of the car-body relatively to the truck, substantially as described.

2. A side bearing for railway-cars consisting of a strut or brace pivoted to the car-bolster, a seat or bearing thereon which is adapted to engage a seat or bearing on said car-bolster, a seat or bearing on the lower or free end of said strut or brace, which is adapted to engage a seat or bearing on the truck-bolster, supporting-surfaces at both sides of said seat or bearing on the truck-bolster and lateral projections on said strut or brace, the relation of parts being such that, when the free end of said strut or brace and one of the lateral projections thereon are in contact with one of said supporting-surfaces at the side of the seat or bearing on the truck-bolster, the other of said lateral projections will be in contact with a rigid support on the car-bolster, substantially as described.

3. A side bearing for railway-cars consisting of a strut or brace pivoted to the car-bolster, seats or surfaces thereon which are adapted to engage corresponding seats or surfaces on the car-bolster, the free end of said strut or brace being circular and being adapted to engage a corresponding circular seat formed in the truck-bolster, plane surfaces on each side of said seat or recess in the truck-bolster, lateral projections on said strut or brace which are adapted to be brought into contact with said plane surfaces on the truck-bolster and with the car-bolster by pivotal movement of the truck relatively to the car-body, the relation of parts being such that, when the strut or brace is entirely withdrawn from its seat in the truck-bolster and rests upon the plane surface on said truck-bolster together with one of the lateral projections thereon, the other of said lateral projections will be in contact with a rigid support on the car-bolster, substantially as described.

4. A side bearing for railway-cars consisting of a strut or brace pivoted to the car-bolster, circular seats or surfaces on which are adapted to engage corresponding circular seats or surfaces formed on the car and truck bolsters and lateral projections on said strut or brace adapted to be brought into contact with rigid supports on the car and truck bolsters by pivotal movement of said truck, the elements of said bearing-surfaces extending radially relatively to the king-bolt which connects the truck to the car-body, substantially as described.

In testimony that I claim the foregoing as my invention I have hereunto set my hand this 2d day of December, 1897.

CHESTER C. BORTON.

Witnesses:
EDGAR C. DODGE,
H. B. HALVORSEN.